(12) United States Patent
Gong et al.

(10) Patent No.: US 7,967,989 B2
(45) Date of Patent: Jun. 28, 2011

(54) GROUNDWATER RECHARGING WASTEWATER DISPOSAL METHOD

(75) Inventors: Terry Gong, Moraga, CA (US); John Harmon, Bakersfield, CA (US); Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 225 days.

(21) Appl. No.: 12/381,246

(22) Filed: Mar. 10, 2009

(65) Prior Publication Data

US 2010/0230363 A1 Sep. 16, 2010

(51) Int. Cl.
*C02F 1/52* (2006.01)
*C02F 1/62* (2006.01)

(52) U.S. Cl. ............ 210/696; 71/12; 210/716; 210/724; 210/747; 210/764; 210/906; 210/912; 210/916; 405/129.25

(58) Field of Classification Search .................... 210/696
See application file for complete search history.

(56) References Cited

U.S. PATENT DOCUMENTS

| | | | |
|---|---|---|---|
| 4,304,673 A | 12/1981 | Reynolds et al. | |
| 4,340,489 A | 7/1982 | Adams et al. | |
| 4,670,157 A * | 6/1987 | Nicksic | 210/696 |
| 4,765,911 A | 8/1988 | Rasmussen | |
| 5,221,312 A | 6/1993 | Buhidar | |
| 5,552,051 A * | 9/1996 | Wang et al. | 210/604 |
| 7,416,608 B2 | 8/2008 | Theodore | |
| 7,429,329 B2 | 9/2008 | Theodore | |
| 7,455,773 B1 | 11/2008 | Harmon et al. | |
| 7,563,372 B1 * | 7/2009 | Theodore | 210/609 |
| 7,566,400 B2 * | 7/2009 | Harmon et al. | 210/631 |

OTHER PUBLICATIONS

UN Environmental Programme Division of Technology, Industry, and Economics Newsletter and Technical Publications Freshwater Management Series 1 Biosolids Management: etc., Aug. 10, 2005.
F. Brissaud, Chapter 2 Groundwater recharge with recycled municipal wastewater: criteria for health related guidelines, at pp. 10-14.

* cited by examiner

*Primary Examiner* — Peter A Hruskoci
(74) *Attorney, Agent, or Firm* — Marcus G. Theodore

(57) ABSTRACT

A sulfurous acid treated wastewater disposal method employing soil aquifer treatment (SAT) for artificial recharge of groundwater through infiltration basins allowing fully or partially-treated sewage effluent to infiltrate into the soil and move down to the groundwater through a "vadose" zone, which acts as a natural filter to remove essentially all suspended solids, biodegradable materials, bacteria, viruses, and other microorganisms.

10 Claims, No Drawings

GROUNDWATER RECHARGING WASTEWATER DISPOSAL METHOD

BACKGROUND OF THE INVENTION

1. Field

This invention pertains to wastewater treatment and disposal methods. In particular, it relates to a subsurface wastewater disposal method and apparatus employing sulfur dioxide pretreatment of wastewater before passing it through a soil aquifer treatment (SAT) system for artificial recharge of groundwater through infiltration allowing fully or partially-treated sewage effluent to infiltrate into the soil and move down to the groundwater through a "vadose" zone, which acts as a natural filter to remove essentially all suspended solids, biodegradable materials, bacteria, viruses, and other microorganisms. Significant reductions in nitrogen, phosphorus, and heavy metals concentrations are also achieved. It is of particular use where reclaimed wastewater agricultural usage is not economically or technologically feasible.

2. State of the Art

Various sewage treatment methods and plants are known. Most large municipal systems employ a series of settling ponds sequentially concentrating the solids contained in wastewater either with or without polymers for separation from liquids via mechanical separation means, such as belt presses. In order to produce a clean effluent that can be safely discharged to watercourses, wastewater treatment operations use three or four distinct stages of treatment to remove harmful contaminants; according to the United Nations Environmental Programme Division of Technology, Industry, and Economics Newsletter and Technical Publications Freshwater Management Series No. 1, *"Biosolids Management: An Environmentally Sound Approach for Managing Sewage Treatment Plant Sludge"* which goes on to say: "Each of these stages mimics and accelerates processes that occur in nature.

Preliminary wastewater treatment usually involves gravity sedimentation of screened wastewater to remove settled solids. Half of the solids suspended in wastewater are removed through primary treatment. The residual material from this process is a concentrated suspension called primary sludge, which will undergo further treatment to become biosolids.

Secondary wastewater treatment is accomplished through a biological process, which removes biodegradable material. This treatment process uses microorganisms to consume dissolved and suspended organic matter, producing carbon dioxide and other by-products. The organic matter also provides nutrients needed to sustain the communities of microorganisms. As microorganisms feed, their density increases and they settle to the bottom of processing tanks, separated from the clarified water as a concentrated suspension called secondary sludge, biological sludge, waste activated sludge, or trickling filter humus.

Tertiary or advanced treatment is used when extremely high-quality effluent is required, such as direct discharge to a drinking water source. The solid residual collected through tertiary treatment consists mainly of chemicals added to clean the final effluent, which are reclaimed before discharge, and therefore not incorporated into biosolids.

Combined primary and secondary solids comprise the majority of material used at municipal plants for biosolids production. Careful management throughout the entire treatment process allows plant operators to control the solids content, nutrient value and other constituents of biosolids.

The Municipal Sludge-to-Biosolids Treatment Process

There are three important factors to be addressed through further processing before this material can be utilized: (1) pathogen levels, (2) presence of potentially harmful industrial contaminants, and (3) water content.

The principal process employed to convert municipal sludge into biosolids is called stabilization. Stabilization accelerates the biodegradation of organic compounds, reduces the microbial population including pathogens, and renders the material microbiologically safe for agricultural use. Biological stabilization uses aerobic or anaerobic treatment to reduce the organic content of solids through controlled biodegradation. Chemical stabilization does not reduce the quantity of biodegradable organic matter in solids, but creates process conditions that inhibit microorganisms, thereby slowing the degradation of organic materials and reducing odors. The most common chemical stabilization procedure is to elevate the pH level of the solids using lime or other alkaline materials. Thermal drying and composting can also be used to stabilize biosolids. Full pasteurization of biosolids is not needed when the primary use is cropland application. Any potential risk to human health due to exposure to pathogens is eliminated through proper application procedures and in-situ microbial decomposition.

The presence of contaminants in the sludge or biosolids arising from industrial discharges is a more challenging problem and may be the deciding factor in determining the choice of a utilization disposal option. Put simply, many industries have habitually used the sewer system as a convenient and low-cost way to discharge hazardous wastes. The contaminants accumulate in the biomass and sludge, and can render the material unfit for any beneficial use. The most common options used for disposal of this contaminated material are landfill or incinerations, the cost of which is usually borne by the municipality rather than the hazardous waste generator. Biosolids utilization is a good, environmentally sustainable option when the wastewater is from municipal sources only, or when a fully enforced industrial pre-treatment and discharge control system is in place. The decision to select an environmentally sustainable approach to biosolids management can be used very effectively to review and correct polluting practices up-stream that should not be taking place.

The final concern is the water content of the biosolids product. Primary and secondary sludge generally contain no more than four percent solids, and the storage and transportation costs of this semi-liquid material limit the application to nearby farmland. Processes to remove water from solids, therefore, are common in biosolids production. The simplest method for removing water is gravity thickening, which involves concentration by simple sedimentation. Allowing sufficient time for solids to settle in tanks can increase suspended solids concentration to five or six percent. Thickening can also include flotation processes, gravity drainage belts, perforated rotating drums, and centrifuges. Nothing is added to biosolids during the gravity thickening processes.

Dewatering is another standard method of water removal in biosolids production. Simple dewatering involves containment of wastewater solids in drying beds or lagoons, where gravity, drainage, and evaporation remove moisture. More often, dewatering involves mechanical equipment such as filter presses, vacuum filters, and centrifuges. Mechanically dewatered solids typically contain between 20% and 45% solids. Finally, drying processes can be used to remove even larger volumes of water from biosolids. Thermal drying with direct or indirect dryers followed by polarization can remove virtually all water and stabilize biosolids to the point of full compliance with any regulatory requirement. This method is used where there is a viable commercial market for the palletized product."

Thus a particular wastewater treatment facility design is highly dependent upon the wastewater inflows and sludge composition and the discharge and treatment permitting restrictions and plant objectives. Oftentimes these plant designs employ thermophilic and other digestion processes to break down the sludge as part of the separation process. For example, Haase, U.S. Pat. No. 5,906,750 discloses a method for dewatering of sludge that has been digested by a thermophilic digestion process employing polymers. The polymers are extremely hydrophilic as they agglomerate fine particles for separation from the wastewater in the belt presses. This gelatinous mechanically separated mass is then usually land filled or admixed with other fuels for burning, and may contain significant pathogens and heavy metals. Once deposited and covered, these landfills do not breakdown rapidly. They comprise large deposits of unstable gelatinous soil, which acts as a breading ground for pathogens. If these separated solids are treated with chlorine for pathogen kill, chlorinated carcinogens often result, creating a different environmental hazard.

The mechanically separated gray water by-product is usually not treated and is then used for agricultural application, or dumped into a body of water for dilution. If treated with chlorine to kill pathogens before land application or dumping, its usage for agricultural purposes is lost as chlorine acts as an herbicide.

In addition, mechanical sludge separation typically requires a large series of settling ponds with wastewater residence times therein typically from 24 to 48 hours, depending upon the weather and nature of the sludge processed. Typically, landfill and polymer costs comprise approximately 30 percent of the wastewater treatment costs.

Other mechanical filtration methods provide sludge separation, but require continual unplugging of the filters; thereby generating significant ongoing costs of filter replacement and declining effectiveness as the filter is entrained with the separated solids.

As long as a mechanical sewage separation plant does not have to be moved and operates within its environmental discharge and landfill permit constraints, it provides a low operating and maintenance cost effective sewage disposal method but requires significant upfront capital investment and may result in long term environmental clean-up costs. As urban populations being served grow, and landfill costs increase, these plants seldom meet permitting constraints without significant upgrades in design, particularly with respect to pathogen gray water discharge and the negative impacts caused by mountains of gelatinous solids.

Other chemical wastewater treatment methods employ chemical agglomeration and disposal methods, such as Adams et al., U.S. Pat. No. 4,340,489 issued Jul. 21, 1982 wherein wastewater is treated with sufficient sulfurous acid to effectuate disinfection. Polymers and other separation methods are then employed to remove the solids. Reynolds et. al, U.S. Pat. No. 4,304,673 issued Dec. 8, 1981 is another wastewater treatment process employing chemicals to continuously disinfect sewage sludge in a similar manner as Adams et al. Rasmussen, U.S. Pat. No. 4,765,911 issued Aug. 23, 1988 is another two-stage chemical treatment process for treating aerobic or anaerobic sewage sludge. These chemical wastewater treatment methods are not package systems, which can be moved as needed to accommodate the needs of a community, particularly in riparian areas subject to flooding, and rely heavily on polymers. They do not address BOD's and ammonia in treated wastewater.

Other hybrid wastewater treatment methods directed primarily to recover treated wastewater for re-use are: Harmon et al, U.S. Pat. No. 7,455,773, issued Nov. 25, 2008, "Package Wastewater Chemical/Biological Treatment Plant Recovery Apparatus and Method"; Theodore, U.S. Pat. No. 7,416,608 issued Aug. 26, 2008, "Wastewater Chemical/Biological Treatment Plant Recovery Apparatus and Method"; and Theodore, U.S. Pat. No. 7,429,329 issued Sep. 30, 2008, "Hybrid Chemical/Mechanical Dewatering Method and Apparatus for Sewage Treatment Plants.

Cited for general interest is Buhidar, U.S. Pat. No. 5,221,312 issued Jun. 22, 1993 directed to a Water and Soil Treatment Method employing SO2 injected into an aqueous media for field application to prepare soil growing surfaces by reducing bicarbonate buildup therein while providing sulfur nutrients for crop improvement.

The above methods are directed primarily to recover treated wastewater for open water discharge or land application and consumption.

However, in areas where open stream discharge is not feasible, or land application of recovered wastewater for irrigation is not economically or technically feasible, soil aquifer treatment (SAT) is often employed As explained by F. Brissaud, Chapter 2 entitled "Groundwater recharge with recycled municipal wastewater: "criteria for health related guidelines," at pages 10-14, www.who.int/entity/water_sanitation_health/wastewater/wsh0308chap2.pdf where soil and groundwater conditions are favorable for artificial recharge of groundwater through infiltration basins, a high degree of upgrading can be achieved by allowing partially-treated sewage effluent to infiltrate into the soil and move down to the groundwater. The unsaturated or "vadose" zone then acts as a natural filter to remove essentially all suspended solids, biodegradable materials, bacteria, viruses, and other microorganisms. Significant reductions in nitrogen, phosphorus, and heavy metals concentrations can also be achieved.

After the sewage, treated in passage through the vadose zone, has reached the groundwater it is usually allowed to flow some distance through the aquifer before it is collected or discharged into the ocean in coastal regions. This additional movement through the aquifer can produce further purification (removal of microorganisms, precipitation of phosphates, adsorption of synthetic organics, etc.) of the sewage. Since the soil and aquifer are used as natural treatment, these systems are called soil-aquifer treatment systems or SAT systems. Soil-aquifer treatment is, essentially, a low-technology, advanced wastewater treatment system. It also has an aesthetic advantage over conventionally treated sewage in that water recovered from an SAT system is not only clear and odor-free but it comes from a well, drain, or via natural drainage to a stream or low area, rather than directly from a sewer or sewage treatment plant. Thus, the water has lost its connotation of sewage and the public see it water more as coming out of the ground (groundwater) than as sewage effluent, which is an important factor in the public acceptance of sewage reuse schemes.

While SAT systems give considerable water quality improvement to the sewage effluent, the quality of the resulting renovated water is not often as good as that of the native groundwater. Thus, SAT systems must be designed and managed to prevent encroachment of sewage water into the aquifer outside the portion of the aquifer used for soil-aquifer treatment.

Infiltration basins for SAT systems should be located in soils that are permeable enough to give high infiltration rates. This requirement is important where sewage flows are relatively large, where excessive basin areas should be avoided (due to land cost) and where evaporation losses from the basins should be minimized. The soils, however, should also be fine enough to provide good filtration and quality improvement of the effluent as it passes through. Thus, the best surface soils for SAT systems are in the fine sand, loamy sand, and sandy loam range. Materials deeper in the vadose zone should be granular and preferably coarser than the surface soils. Soil profiles consisting of coarse-textured material on top and finer-textured material deeper down should be avoided because of the danger that fine suspended material in the sewage will move through the coarse upper material and accumulate on the deeper, finer material. This could cause clogging of the soil profile at some depth, where removal of the clogging material would be very difficult.

Vadose zones should not contain clay layers or other soils that could restrict the downward movement of water and form perched groundwater mounds. Aquifers should be sufficiently deep and transmissive to prevent excessive rises of the groundwater table (mounding) due to infiltration. Groundwater tables should be at least 1 meter below the bottom of the infiltration basins during flooding. Above all, soil and aquifer materials should be granular. Fractured-rock aquifers should be protected by a soil mantle of adequate texture and thickness (at least a few meters). Shallow soils underlain by fractured rock are not suitable for SAT systems.

As further explained by F. Brissaud, these SAT systems also require periodic maintenance and monitoring. Bare soil is often the best condition for the bottom of infiltration basins in SAT systems. Occasional weeds are no problem but too many weeds can hamper the soil drying process, which delays recovery of infiltration rates. Dense weeds can also aggravate mosquito and other insect problems. Low water depths (about 20 cm) may be preferable to large water depths (about 1 m) because the turnover rate of sewage applied to shallow basins is faster than for deep basins of the same infiltration rate, thus giving suspended algae less time to develop in shallow basins. Suspended algae can produce low infiltration rates because they are filtered out on the basin bottom, where they clog the soil. Also, algae, being photosynthetic, remove dissolved carbon dioxide from the water, which increases the pH of the water. At high algal concentrations, this can cause the pH to rise to 9 or 10 which, in turn, causes precipitation of calcium carbonate. This cements the soil surface and results in further soil clogging and reduction of infiltration rates. Because suspended algae and soil clogging problems are reduced, shallow basins generally yield higher hydraulic loading rates than deep basins.

During flooding, organic and other suspended solids in the sewage effluent accumulate on the bottom of the basins, producing a clogging layer which causes infiltration rates to decline. Drying of the basins causes the clogging layer to dry, crack, and form curled-up flakes; the organic material also decomposes. These processes restore the hydraulic capacity so that when the basins are flooded again, infiltration rates are close to the original, high levels. However, as flooding continues, infiltration rates decrease again until they become so low that another drying period is necessary.

Depending on how much material accumulates on the bottom of infiltration basins, periodic removal of this material is necessary. Removing the material by raking or scraping is much better than mixing it with the soil with, for example, a disk harrow. The latter practice will lead to gradual accumulation of clogging materials in the top 10 or 20 cm of the soil, eventually necessitating complete removal of this layer, which could be expensive.

For clean secondary sewage effluent with suspended solids concentration of 10 to 20 mg/l, flooding and drying periods can be as long as 2 weeks each, and cleaning of basin bottoms may be necessary only once a year or once every 2 years. Primary effluent, with much higher suspended solids concentration, will require a schedule which might be 2 days flooding-8 days drying, and basin bottoms might be expected to require cleaning at the end of almost every drying period. The best schedule of flooding, drying, and cleaning of basins in a given system must be evaluated by on-site experimentation.

To minimize SAT maintenance costs and promote better filtration, pretreatment of the wastewater is required by removing many of the constituents of the wastewater before ground water injection. Therefore, what is needed is a pretreatment method and apparatus to promote ground water permeability, disinfect bacteria and viruses, and prevent pond odors. The pretreatment method described below provides such an invention.

SUMMARY OF THE INVENTION

The invention comprises a groundwater recharging wastewater disposal method and apparatus comprising: injecting sufficient $SO_2$ into the wastewater and wastewater process streams to form an acidified, disinfected, and deodorized wastewater at sufficient acid levels to prevent bicarbonates/carbonate deposits from forming, before passing the acidified, disinfected and deodorized wastewater through a soil aquifer treatment (SAT) system, such as a porous lagoon, well injection system, percolation pond or any other infiltration system that allows water to percolate (or seep) through layers of rock and gravel. The water is cleaned as it slowly travels downward and eventually reaches an underground aquifer to provide a quality of recharging wastewater so that the water in the underground aquifer is not polluted. The purpose of manmade percolation ponds is both to clean the water and to keep the ground from sinking. These soil aquifer treatment systems will all be referred to hereafter as SAT systems.

The $SO_2$ in sulfurous acid is a powerful reducing agent and not only reduces alkalinity in the wastewater, but removes bicarbonate/carbonate buildup in the soil pores to increase water permeability into the underground aquifer barrier for recharging. Sulfur dioxide has lone electron pairs, which can act as a Lewis base. It can also act as a Lewis acid. The dissolved SO2 gaseous content also varies with temperature.

$SO_2$ pre-treatment may be applied to any wastewater or wastewater process stream. The main constituent that must be removed from raw sewage before it is applied to an SAT system is suspended solids. Reductions in BOD and bacteria are also desirable, but less essential. In larger municipalities, sewage typically receives conventional primary and secondary treatment, where the secondary treatment removes mostly biodegradable material (BOD's). The SO2 pre-treatment acts as a non-chlorine biocide to kill pathogenic organisms. Nitrogen concentration might also have to be reduced and suspended solids and biodegradable materials should perhaps be removed to protect the irrigation system or for aesthetic reasons. If the renovated water is to be used for recreational lakes or discharged into surface water, phosphorus should also be removed to prevent algal growth in the receiving water. However, this would not preclude subsequent SO2 treatment to prevent bicarbonate/carbonate buildup in the treated wastewater.

Primary effluent would have a higher BOD and suspended solids content than secondary effluent and this would result in somewhat lower hydraulic loading rates for the SAT system and would require more frequent basin cleaning. However, elimination of the secondary step in conventional pretreatment of the effluent would result in very significant cost savings for the overall system. Thus, the pre-treatment method may be used to treat raw incoming wastewater, or various wastewater process streams, depending upon the amount of organic removal required before SAT system injection.

Preferably, most of the solids have been removed via a primary clarifier or mechanical filtration. Prefiltering of the solids not only extends the maintenance cycle of the SAT system, but the filtered wastewater can pass directly through a sulfurous acid generator without fouling. It was found through testing that sulfurous acid generators, such as the Harmon Systems International, LLC models condition and treat incoming raw wastewater solids to self agglomerate into colloidal self adhering solids so that they do not adhere to the surfaces of the sulfur generator.

The sulfur dioxide is injected into the wastewater and wastewater process streams at a pH between approximately 1.5 and approximately 3.5, depending upon the dwell time required for conditioning and disinfection. At these pH ranges, sufficient SO2 is generated to condition solids for separation, and disinfection and deodorizing of the wastewater.

Sulfurous acid generators produce a sulfurous acid treated wastewater solids and liquid composition having a pH of approximately 1.5 to 3.5; provided the larger foreign matter is first coarsely screened with a filter or commutated with a grinder so that the larger particles do not obstruct the sulfurous acid generator or foul the SAT system. This equipment has been shown to provide an excellent means which insures effective SO2 contact with the wastewater solids and liquids. The acid generator also has the advantage of generating SO2 as needed, avoiding the dangers of stored SO2 tank storage. However, the main advantage in passing the wastewater directly through the sulfurous acid generator is that it doesn't add additional acid and water to the wastewater treatment and separation process as is encountered with split streaming wherein a second acid is added to lower the pH to generate free SO2 for disinfection. Consequently, the treated wastewater volume is not affected; thereby saving additional treatment water.

The SO2 can be delivered during the wastewater treatment process, or after the recovered treated wastewater enters the SAT system. The pH is periodically monitored to insure adequate sulfurous acid is present to breakdown the soil bicarbonate/carbonate deposits to open the soil pores. Consequently, sulfurous acid delivery may be continuous or intermittent, as needed. For example, when heavy runoff enters the wastewater treatment system, additional sulfurous acid may be required. Or, if pond scum becomes evident, additional acid is added to stop this growth.

Soil is an effective filter to remove microorganisms from sewage effluent (except, of course, coarse soils such as sands and gravels, or fractured rock). According to F. Brissaud, many studies indicate essentially complete faecal coliform removal after percolation of 1 to a few meters through the soil. However, much longer distances of underground travel of microorganisms have also been reported. Usually, these long distances are associated with macro pores, as may be found in gravelly or other coarse materials, structured or cracked clay soils, fractured rock, cavernous limestones, etc. Bacteria are physically strained from the water, whereas the much smaller viruses are usually adsorbed. This adsorption is favored by a low pH, a high salt concentration in the sewage, and high relative concentrations of calcium and magnesium over monovalent cations such as sodium and potassium. Human bacteria and viruses immobilized in the soil do not reproduce, and eventually die. Most bacteria and viruses die in a few weeks to a few months, but much longer survival times have also been reported.

The best protection against breakthrough of pathogenic microorganisms in the renovated sewage water from SAT systems is to reduce bacterial levels in the sewage effluent before infiltration, to avoid coarse textured materials in the SAT systems, and to avoid requirements for long underground travel distances and retention times. SO2 pre-treatment exposures at an elevated pH of approximately 2 with a free SO2 concentration of at least 5 mg/l. for approximately 10 minutes results in complete disinfection according to Adams et al., U.S. Pat. No. 4,340,489. Detention at 60 minutes at a pH of 3 not only results in complete disinfection, but little significant additional solids separation and agglomeration occurs according to recent Montalvo Improvement District tests conducted at Ventura, Calif. In addition, pre-treatment aeration of the wastewater and wastewater streams deactivates many viruses.

Similarly, the best protection against nitrogen is pre-treatment removal via plants, bacteria, algae, etc assimilation and denitrification. Often these same nitrogen removal steps also remove phosphorous as well, which is taken up by these living organisms. During pretreatment of the sewage, and in passage through the soil of the SAT system, organic phosphorus is biologically converted to phosphate. In calcareous soils and at alkaline pH, phosphate precipitates with calcium to form calcium phosphate. In acid soils, phosphate reacts with iron and aluminum oxides in the soil to form insoluble compounds.

Other overly concentrated metals and undesirable salts are similarly diluted or removed from the wastewater and wastewater process streams before SO2 pretreatment and entry into the SAT system.

The SAT system impoundment holding times vary based on the wastewater content, the soil porosity, and the pH utilized. The sulfurous acid self agglomerates many solids, which fall to the bottom of the holding pond, leaving a clear disinfected acidic odor free liquid fraction, which repels insects, such as mosquitoes. The holding pond pH is greater than or equal to 2, which is the approximate pH of lemonade. Harmful exposure to humans accidentally coming into contact with the disinfected holding pond waters does not cause injury. The sulfurous acid solution continues to break down bicarbonate/carbonate buildup in the soil via delayed acid release from the bisulfate ionic specie; thereby increasing soil porosity and flow characteristics.

The SO2 pre-treatment of wastewater and wastewater process flows thus provides a method of extending the effectiveness and maintenance life of SAT systems using acidified, disinfected, deodorized, reclaimed wastewater. The groundwater recharging wastewater disposal method is particularly useful for disposing of treated wastewater until an end user is located for its use.

Examples of various apparatus configurations for SO2 pre-treatment of wastewater are found in Harmon et al, U.S. Pat. No. 7,455,773 issued Nov. 25, 2008, and its continuation-in-part application filed Sep. 26, 2008; and in Theodore, U.S. Pat. No. 7,416,608 issued Aug. 26, 2008, "Wastewater Chemical/Biological Treatment Plant Recovery Apparatus and Method"; and Theodore, U.S. Pat. No. 7,429,329 issued Sep. 30, 2008, "Hybrid Chemical/Mechanical Dewatering Method and Apparatus for Sewage Treatment Plants. These patent equipment configurations include a final liming adjustment step for plant consumption, which is omitted for this sulfurous acid pre-treatment process for SAT system injection.

Although this specification has referred to various specific embodiments, it is not intended to restrict the scope of the claims. The claims themselves recite those features deemed essential to the invention.

We claim:

1. A groundwater recharging wastewater disposal method comprising:
   a. injecting sufficient $SO_2$ into wastewater and wastewater process streams to form an acidified, disinfected, and deodorized wastewater at sufficient acid levels to prevent bicarbonates/carbonate soil deposits from forming, and
   b. passing the acidified, disinfected and deodorized wastewater through a soil aquifer treatment (SAT) system with a vadose zone, which acts as a natural filter to remove suspended solids, biodegradable materials, bacteria, viruses, microorganisms, reduce nitrogen, phosphorus, and heavy metals concentrations, and remove bicarbonate/carbonate buildup in the SAT system vadose zone soil pores to increase water permeability into an underground aquifer for recharging, wherein a quality of recharging wastewater is provided so that the water in the underground aquifer is not polluted.

2. A groundwater recharging wastewater disposal method, according to claim 1, including first removing heavy metals, BODs, nitrogen compounds, and phosphorous compounds from the wastewater before injecting the $SO_2$.

3. A groundwater recharging wastewater disposal method according to claim 1, wherein the $SO_2$ is added by passing screened wastewater through a sulfurous acid generator for admixing with sulfur dioxide at a pH of between approximately 1.5 and approximately 4.5, which generates sufficient free $SO_2$ to disinfect the wastewater.

4. A groundwater recharging wastewater disposal method, according to claim 1, wherein the wastewater is passed through at least one woven bag placed in a roll-off container structured to collect screened liquids draining through the woven hag for passage through a sulfurous acid generator; the woven bag porosity selected such that an inflow stream does not plug up the sulfurous acid generator and for the desired odor containment.

5. A groundwater recharging wastewater disposal method according to claim 4, wherein holding time is selected to sufficiently agglomerate the suspended solids for capture within the porous woven drain bag.

6. A groundwater recharging wastewater disposal method for wastewater inflow streams with dissolved and undissolved solids comprising:
   a. screening of the solids in the wastewater inflow stream to allow passage through a sulfurous acid generator for admixing with sulfurous acid at a pH between approximately 1.5 and approximately 4.5 to inject sufficient $SO_2$ to condition the solids for separation and deodorize the acidified wastewater, with a drain bag weave porosity selected such that the inflow stream solids particles in the screened wastewater do not plug or interfere with operation of the sulfurous acid generator and contain odors of any separated solids,
   b. transmitting into a detention impoundment the acidified wastewater to hold the same for a period of time until the wastewater odor is suppressed and the suspended solids are conditioned to agglomerate and separate from the liquid fraction of the acidified wastewater and the dissolved solids and ammonia are conditioned and the required disinfection occurs,
   c. screening the agglomerated solids from the acidified wastewater to remove suspended solids at a level required for groundwater recharging, and
   d. passing the acidified, disinfected and deodorized wastewater through a soil aquifer treatment (SAT) system with vadose zone, which acts as a natural filter to remove suspended solids, biodegradable materials bacteria viruses, microorganisms reduce nitrogen, phosphorous, and heavy metals concentrations, and remove bicarbonate/carbonate buildup in the SAT system vadose zone soil pores to increase water permeability into an underground aquifer for recharging wherein a quality of recharging wastewater is provided so that the water in the underground aquifer is not polluted.

7. A groundwater recharging wastewater disposal method according to claim 6, wherein holding time in the detention impoundment is selected to sufficiently agglomerate the suspended solids far capture within mesh of a drain bag.

8. A groundwater recharging wastewater disposal method according to claim 6, wherein the separated suspended solids are allowed to chemically dewater to provide a high BTU content solid with low water content for land application, burning or gasification.

9. A groundwater recharging wastewater disposal method according to claim 6, including raising the pH of the acidified the conditioned wastewater up to approximately 11 to first precipitate heavy metals contained in the wastewater as metal hydroxides for filtration removal, and the resultant metal free filtrate is then pH reduced before being passed through a soil aquifer treatment (SAT) system to remove bicarbonate/carbonate buildup in SAT system vadose system soil pores to increase water permeability into an underground aquifer for recharging.

10. A groundwater recharging wastewater disposal method according to claim 6, wherein the acidified, disinfected and deodorized wastewater has insect repellent properties when held above ground.

* * * * *